US012679266B2

(12) United States Patent
Downs

(10) Patent No.: US 12,679,266 B2
(45) Date of Patent: Jul. 14, 2026

(54) BOAT BOW EYE ADAPTER

(71) Applicant: Ramp N Clamp LLC, Lexington, KY (US)

(72) Inventor: Joseph C. Downs, Lexington, KY (US)

(73) Assignee: Ramp N Clamp LLC, Lexington, KY (US)

( * ) Notice: Subject to any disclaimer, the term of this patent is extended or adjusted under 35 U.S.C. 154(b) by 594 days.

(21) Appl. No.: 18/187,753

(22) Filed: Mar. 22, 2023

(65) Prior Publication Data

US 2023/0322146 A1    Oct. 12, 2023

Related U.S. Application Data

(60) Provisional application No. 63/328,500, filed on Apr. 7, 2022.

(51) Int. Cl.
B60P 3/10 (2006.01)

(52) U.S. Cl.
CPC .................................. B60P 3/1033 (2013.01)

(58) Field of Classification Search
CPC ...................................................... B60P 3/1033
USPC ...................................................... 280/414.1
See application file for complete search history.

(56) References Cited

U.S. PATENT DOCUMENTS

| | | | | | |
|---|---|---|---|---|---|
| 3,863,588 | A | * | 2/1975 | Gillespie | B63B 21/04 |
| | | | | | 114/218 |
| 4,146,941 | A | | 4/1979 | Haslam | |
| 5,263,733 | A | * | 11/1993 | Kastenberger | B60P 3/1033 |
| | | | | | 114/344 |
| 5,599,035 | A | * | 2/1997 | Spence | B60P 3/1066 |
| | | | | | 280/414.1 |
| 5,727,805 | A | * | 3/1998 | La Roque | B60D 1/36 |
| | | | | | 280/491.2 |
| 6,981,463 | B1 | * | 1/2006 | Aichele | B63B 21/56 |
| | | | | | 114/364 |
| 7,237,788 | B1 | * | 7/2007 | Norbits | B60P 3/1066 |
| | | | | | 280/414.1 |
| 8,721,239 | B2 | * | 5/2014 | Davis | B60P 3/1066 |
| | | | | | 410/2 |
| 2008/0014053 | A1 | * | 1/2008 | Healy | B60D 1/00 |
| | | | | | 414/138.8 |

* cited by examiner

*Primary Examiner* — Valentin Neacsu
*Assistant Examiner* — Mohamed M Medani
(74) *Attorney, Agent, or Firm* — Michael S. Hargis; Stites & Harbison PLLC

(57) ABSTRACT

An adapter for mounting to a bow eye of a boat and receiving a latch for securing the boat to a trailer is provided. The adapter includes a receiving member defining an aperture for receiving the latch, first and second mounting plates extend from the receiving member, a first fastener extends through the first mounting plate, the bow eye, and the second mounting plate for securing the adapter to the bow eye. The receiving member may include a base attached to an at least partially straight engaging leg which together at least partially define the aperture. The base and engaging leg may be a substantially U-shaped member such as a U-shaped bolt. A damper may be attached to one or more portions of the receiving member to prevent damage to the boat and/or the bow eye.

6 Claims, 6 Drawing Sheets

BOAT BOW EYE ADAPTER

This application claims priority from U.S. Provisional Patent Application No. 63/328,500, filed Apr. 7, 2022, the disclosure of which is incorporated herein by reference.

FIELD OF THE INVENTION

This document relates generally to boats and boat trailers and, more specifically, to an adapter for use in combination with a bow eye of a boat.

BACKGROUND OF THE INVENTION

Boats and watercraft generally have a single center attachment point on the bow or the forward part of the hull. These attachment points are typically referred to as bow eyes. Bow eyes come in numerous different shapes and sizes and are even crafted from varying materials. The variations stem from different manufacturer designs, accommodation of varying hull shapes, and other factors including, for example, function.

Within the boating and watercraft industries, there are a number of accessories associated with the front of a trailer for attaching, towing, or securing a boat or watercraft to the trailer. Typically, a latch mounted to the trailer engages the bow eye for pulling the boat onto the trailer and/or securing the boat in position on the trailer. More specifically, latches typically include a hook that extends through an aperture of the bow eye.

Most of these trailer accessories function best with a bow eye having at least a partially straight engaging leg. Thus, most bow eyes include a U-shaped bolt secured to a base which provides the desired straight engaging leg. When a boat or watercraft does not have a U-shaped bow eye, attachment of the boat or watercraft to the trailer or trailer accessories can be difficult to achieve and/or can cause damage to the bow eye, and even to the boat or watercraft in certain instances. This is particularly the case when the original bow eye does not include at least a partially straight engaging leg, for example, when the bow eye includes a round or circular aperture.

In such scenarios, a capture range of the bow eye is significantly reduced due to the limited size of the aperture created by the upper and lower portions of the circle. If the engaging latch is a little too high or low, the upper and lower portions of the bow eye defining the round aperture can interfere with the latch/hook and not properly engage the bow eye, i.e., allow it to extend through the bow eye aperture. This can lead to frustration on the part of operators, especially when operating alone, and even to damage of or degradation to the bow eye over time through repeated engagement attempts. This is particularly the case when the bow eye is made of softer metals, such as aluminum.

Accordingly, a need exists for a device or adapter that attaches to an existing bow eye whether the existing bow eye is an original equipment manufacturer (OEM) part or an aftermarket replacement. Advantageously, the boat bow eye adapter would convert the OEM bow eye or aftermarket replacement into a high strength bow eye having an at least partially straight engaging leg regardless of the shape/material of the OEM bow eye or aftermarket replacement attached to the hull. In other words, the bow eye adapter would be constructed from material having sufficient strength to avoid degradation through contact with trailer accessories and latching mechanisms associated therewith and to provide a wider engagement range than ranges provided by common bow eyes that do not include at least a partially straight engaging leg. For example, when the bow eyes include round or circular apertures.

SUMMARY OF THE INVENTION

In accordance with the purposes and benefits described herein, an adapter for mounting to a bow eye of a boat and receiving a latch for securing the boat to a trailer is provided. The adapter may be broadly described as comprising a receiving member defining an aperture for receiving the latch, a first mounting plate attached to the receiving member, a second mounting plate attached to the receiving member, and at least one fastener for extending through an aperture defined by the first mounting plate, the bow eye, and an aperture defined by the second mounting plate and for securing the adapter to the bow eye.

In one possible embodiment, the receiving member includes an at least partially straight engaging leg.

In another possible embodiment, the first mounting plate and the second mounting plate extend from the receiving member and define a gap for receiving at least a portion of the bow eye.

In yet another possible embodiment, the at least one fastener includes a first fastener for extending through a first aperture of a first plurality of apertures defined by the first mounting plate, the bow eye, and a first aperture of a second plurality of apertures defined by the second mounting plate, and a second fastener for extending through a second aperture of the first plurality of apertures defined by the first mounting plate and a second aperture of the second plurality of apertures defined by the second mounting plate, and for securing the adapter against the bow eye.

In still one other possible embodiment, the at least one fastener includes a second fastener extending through a second aperture defined by the first mounting plate and a second aperture defined by the second mounting plate such that the second fastener is adjacent an outer surface of the bow eye when mounted.

In another possible embodiment, the adapter further includes at least one damper attached to at least one of the base, an edge of the first mounting plate, an edge of the second mounting plate, an inner face of the first mounting plate, and an inner face of the second mounting plate.

In yet another possible embodiment, the receiving member includes a base attached to a substantially U-shaped member, and the base and the substantially U-shaped member define the aperture for receiving the latch.

In still yet another possible embodiment, the adapter further includes a standoff secured between the first and second mounting plates.

In another possible embodiment, an adapter for mounting to a bow eye of a boat and receiving a latch for securing the boat to a trailer is provided. The adapter may be broadly described as including a receiving member having an at least partially straight engaging leg partially defining an aperture for receiving the latch, at least one mounting plate attached to the receiving member secured against the bow eye by at least one fastener extending through the at least one mounting plate and the bow eye.

In one other possible embodiment, the first mounting plate and a second mounting plate are substantially parallel when secured against the bow eye.

In yet another possible embodiment, the second mounting plate is secured against the bow eye by the at least one fastener, a first of the at least one fastener extends through a first aperture of the plurality of apertures defined by the first mounting plate, the bow eye, and a first aperture of the plurality of apertures defined by the second mounting plate, and a second of the at least one fastener extends through a second aperture of the plurality of apertures defined by the first mounting plate and a second aperture of the plurality of apertures defined by the second mounting plate.

In yet one other possible embodiment, the receiving member includes a base attached to a substantially U-shaped member and the at least partially straight engaging leg forms a portion of the substantially U-shaped member.

In yet still another possible embodiment, the adapter further includes a damper attached to the receiving member.

In still another possible embodiment, an adapter for mounting to a bow eye of a boat and receiving a latch for securing the boat to a trailer is provided. The adapter may be broadly described as comprising a base attached to an at least partially straight engaging leg, the base and the at least partially straight engaging leg at least partially defining an aperture for receiving the latch, a first mounting plate extending from the base, a second mounting plate extending from the base, and at least one fastener for extending through the first mounting plate, the bow eye, and the second mounting plate and for securing the adapter to the bow eye.

In one other possible embodiment, the at least partially straight engaging leg forms part of a substantially U-shaped member attached to the base.

In still yet another possible embodiment, the adapter further includes a damper attached to the base.

In another possible embodiment, the first mounting plate defines a first plurality of apertures aligned in rows and columns, and the second mounting plate defines a second plurality of apertures aligned in rows and columns with the rows and columns of the first plurality of apertures.

In the following description, there are shown and described several embodiments of adapters for mounting to a bow eye of a boat and receiving a latch for securing the boat to a trailer, and related methods. As it should be realized, the adapters are capable of other, different embodiments and their several details are capable of modification in various, obvious aspects all without departing from the adapters as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the bow eye adapter and together with the description serve to explain certain principles thereof. In the drawing figures.

Reference will now be made in detail to the present embodiments of the bow eye adapter, examples of which are illustrated in the accompanying drawing figures, wherein like numerals are used to represent like elements.

DETAILED DESCRIPTION

Figure 1:
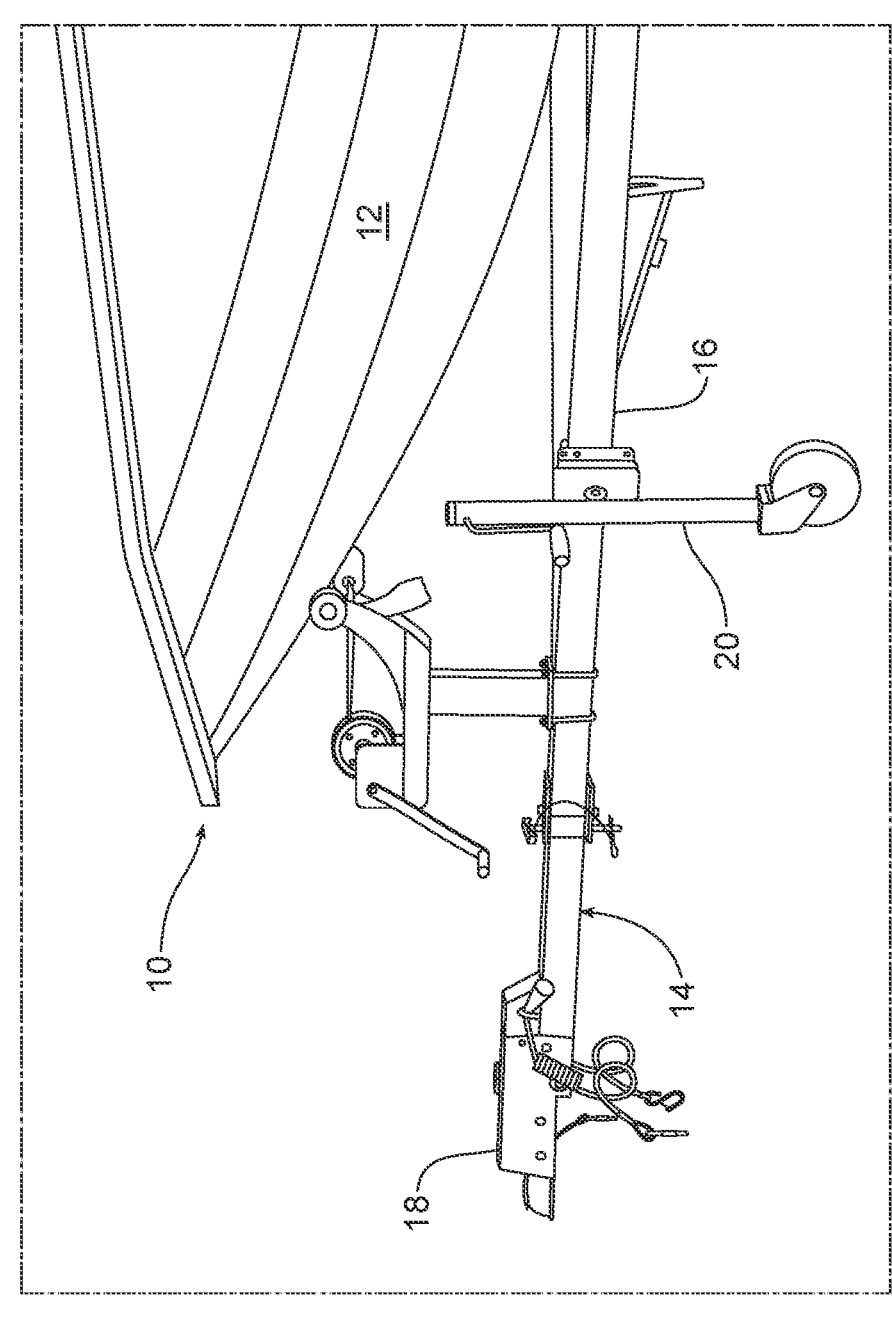
FIG. 1 is a partial side plan view of a boat mounted on a boat trailer.

As shown in FIG. 1, a typical boat 10 having a hull 12 is supported by a trailer 14. Generally, the boat 10 rests on rollers (not shown) attached to a frame 16 of the trailer 14 which aid in the loading and unloading of the boat from the trailer and provide a cushioned support surface for the boat when travelling on the trailer. As is also known, a hitch 18 extends from a front of the trailer frame 16 for attachment to a towing vehicle (not shown) and a height of the hitch may be adjusted using a jack 20 which is also attached to the frame.

Figure 2:
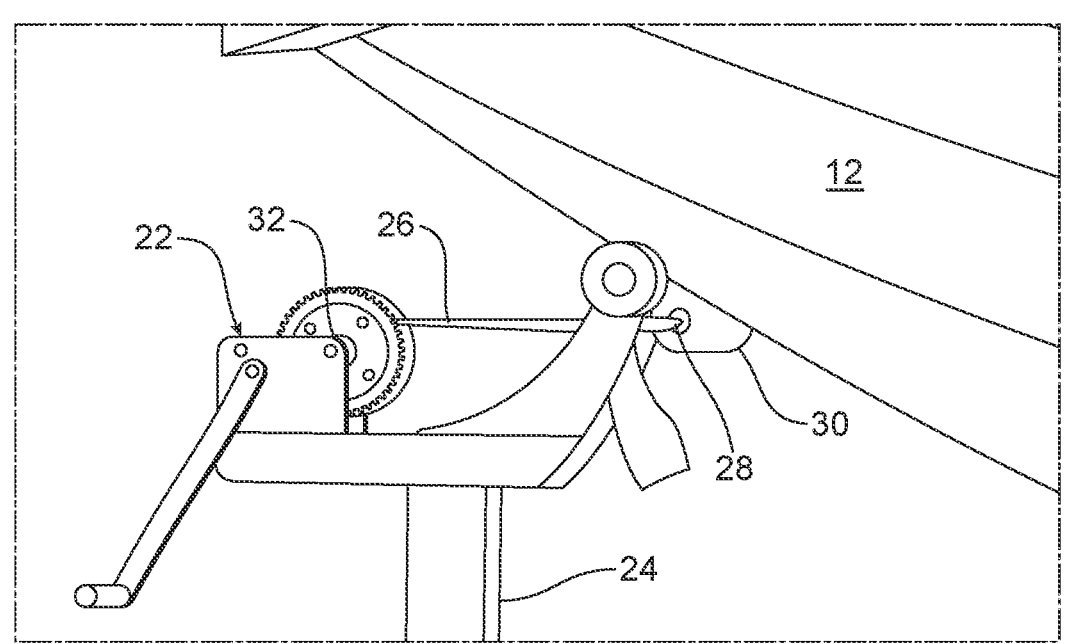
FIG. 2 is a close-up of the partial side plan view of a boat mounted on a boat trailer.

As best shown in FIG. 2, a winch 22 is also typically used to secure the boat 10 to the trailer 14. The winch 22 may or may not be mounted on a stand or mount 24 depending on the type of boat and/or trailer. More specifically, the winch 22 controls movement of a strap 26 having a latch or latching member 28 attached to an end thereof. Latches of this nature are often referred to as capture hooks or latch hooks. In operation, the latch 28 releasably engages a bow eye 30 of the boat 10. Bow eyes commonly extend from a front portion of the boat hull. Once engaged, the winch 22 is used to retract or wind the strap 26 around a drum 32 of the winch in order to pull the boat 10 onto the trailer 14 and to secure the boat in proper position for transport. Boat latches can also be found in latching mechanisms that directly engage the bow eye rather than instead of relying on a strap and winch.

Figure 3:
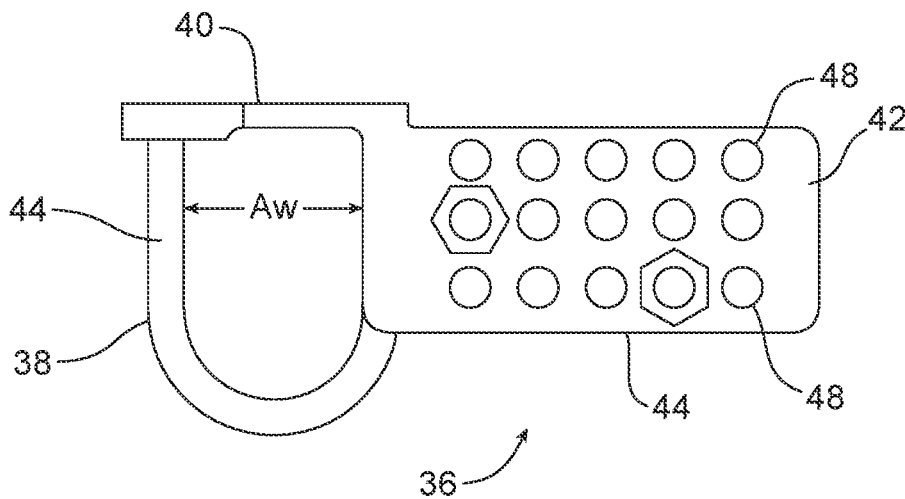
FIG. 3 is a side plan view of a boat bow eye adapter.

In accordance with the present invention, an adapter 36 for mounting to a bow eye (e.g., bow eye 30) of a boat and receiving a latch for securing the boat to a trailer is provided as shown in FIG. 3. In the described embodiment, the adapter 36 includes a U-bolt 38 attached to a base 40 and opposing mounting plates 42. At least one of the U-bolt 38 and base 40 are attached to the opposing mounting plates 42 by welding in the described embodiment but could be formed as a unitary adapter and/or with one or two mounting plates. In still other embodiments, one of the mounting plates could be provided as a separate part, i.e., loose, to be secured against the bow eye by fasteners.

At least the U-bolt 38 is made of metal, preferably steel, or other materials (e.g., composites) that are of a sufficient strength to withstand degradation through contact with latches/hooks of steel and similar metals. Also, while a U-bolt 38 is used in the described invention, the aperture defined by the adapter 36 can take other shapes so long as at least a partially straight engaging leg 44 is provided. As shown, the partially straight engaging leg 44 of adapter 36 provides a generally consistent aperture width (designated reference Aw) to receive latching hooks and the like.

This is particularly evident when compared to the round or circular aperture of a typical bow eye 30 as generally shown in FIG. 3. The aperture width of the round aperture is a maximum at a midpoint of the aperture and consistently decreases whether measured above or below the midpoint due to its circular nature. As is evident, this increasingly limits the aperture width when compared to an aperture at least partially defined by a straight engaging leg. In all embodiments, the aperture may be defined (e.g., within a machined adapter) to be oval, oblong, square, rectangular, or D-shaped or other known shapes that provide an aperture at least partially defined by a straight engaging leg.

Figure 4:
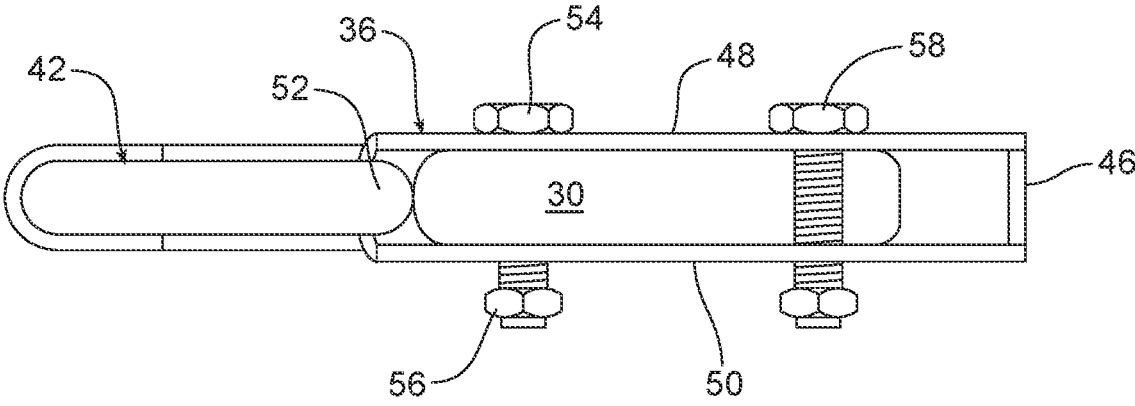
FIG. 4 is a top plan view of the bow eye adapter with a boat bow eye attached thereto.

As shown in FIG. 4, first and second mounting plates 48, 50 extend from each side of a first leg 52 of the U-bolt 38. The mounting plates 48, 50 extend generally parallel to one another and define a gap therebetween. While the described mounting plates 48, 50 include a plurality of apertures, other embodiments can utilize as few as one aperture in each mounting plate. In use, the adapter 36 is positioned over the boat bow eye 30 as shown. More specifically, boat bow eye 30 is positioned at least partially within the gap defined by the mounting plates 48, 50. In still other embodiments, a standoff 46 may be attached to at least one of the mounting plates 48, 50 for maintaining a suitable gap between therebetween.

A first bolt 54 or other fastening means is inserted through at least one of the plurality of apertures in the first mounting plate 48, through at least one of the plurality of apertures in the second mounting plate 50, and secured in position with a nut 56. As shown, the first bolt 54 extends through the first and second mounting plates 48, 50 and the aperture of the bow eye 30. A second bolt 58 similarly extends through different apertures in the first and second mounting plates 48, 50 but not the aperture of the bow eye 30. Rather, the second bolt 58 is positioned adjacent an exterior surface of the bow eye 30 as shown in FIG. 4. In this manner, the first and second bolts 54, 58 engage the bow eye 30 different which works to prevent rotation of the adapter 36 relative the bow eye 30 and boat hull.

As indicated above, the adapter 36 may be secured to the bow eye 30 using a single fastener but at least two fasteners are used in the described embodiment to minimize, if not eliminate, relative movement and/or rotation and to ensure an adequate connection between the parts. Minimizing movement limits wear on the bow eye 30, the hull 12, and the adapter 36.

Figure 5:
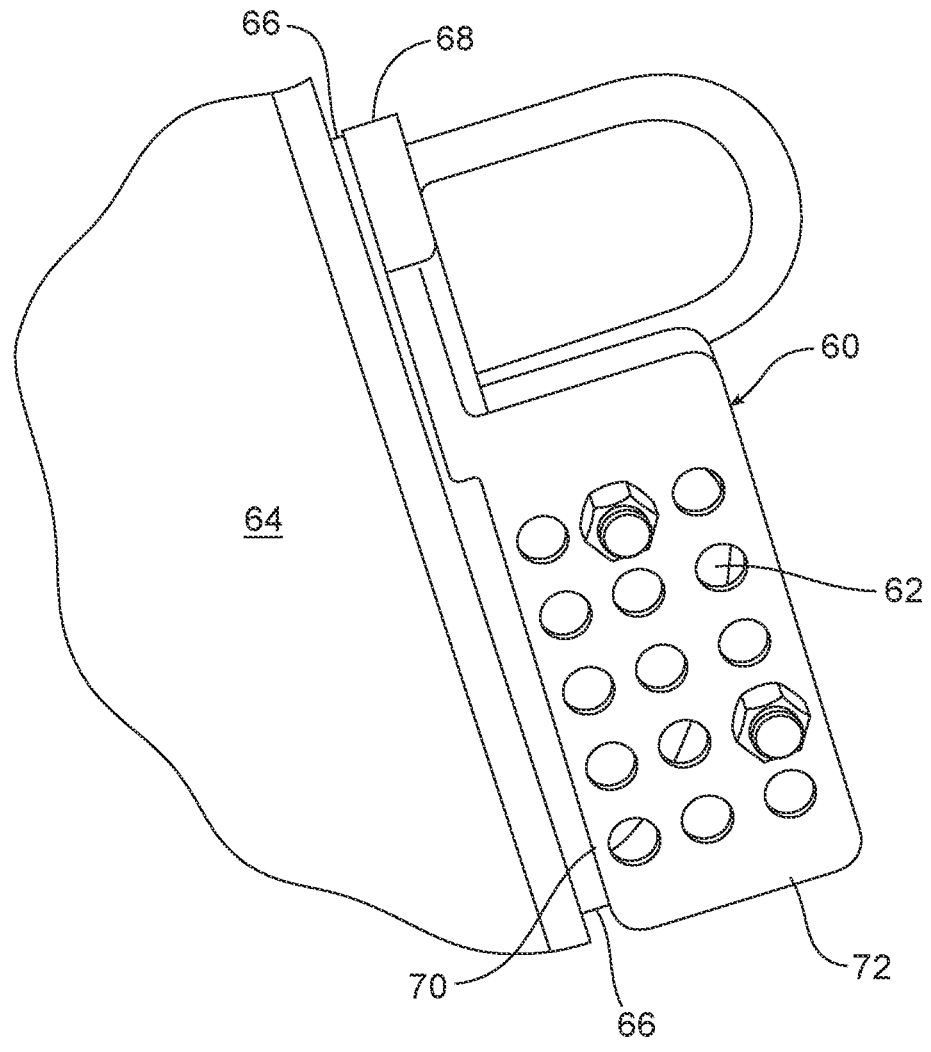
FIG. 5 is a perspective view of the bow eye adapter attached to a boat bow eye.

As shown in FIG. 5, another embodiment of an adapter 60 secured to a bow eye 62 generally abuts a boat hull 64. In this embodiment, a damper or damping layer 66 is added to at least a portion of the adapter 60 to provide damping or cushioning or just a scratch resistant barrier between the adapter and the hull 64. The damping layer 66 may be made of various types of rubbers or like materials that are known to provide damping or cushioning, and/or to resist scratching/contact. In the embodiment shown, the damper 66 generally conforms to a base 68 and edges 70 of mounting plates 72 and is compressed against the hull 64 when the adapter 60 is mounted to the bow eye 62. In other embodiments, however, more than one damper or damper segments may be used to provide damping or a barrier between at least one of the base, an edge of the first mounting plate, an edge of the second mounting plate, an inner face of the first mounting plate, and/or an inner face of the second mounting plate, and the hull. Preferably, relative movement between the adapter and hull is minimized/eliminated in each of the described embodiments.

Figure 6:
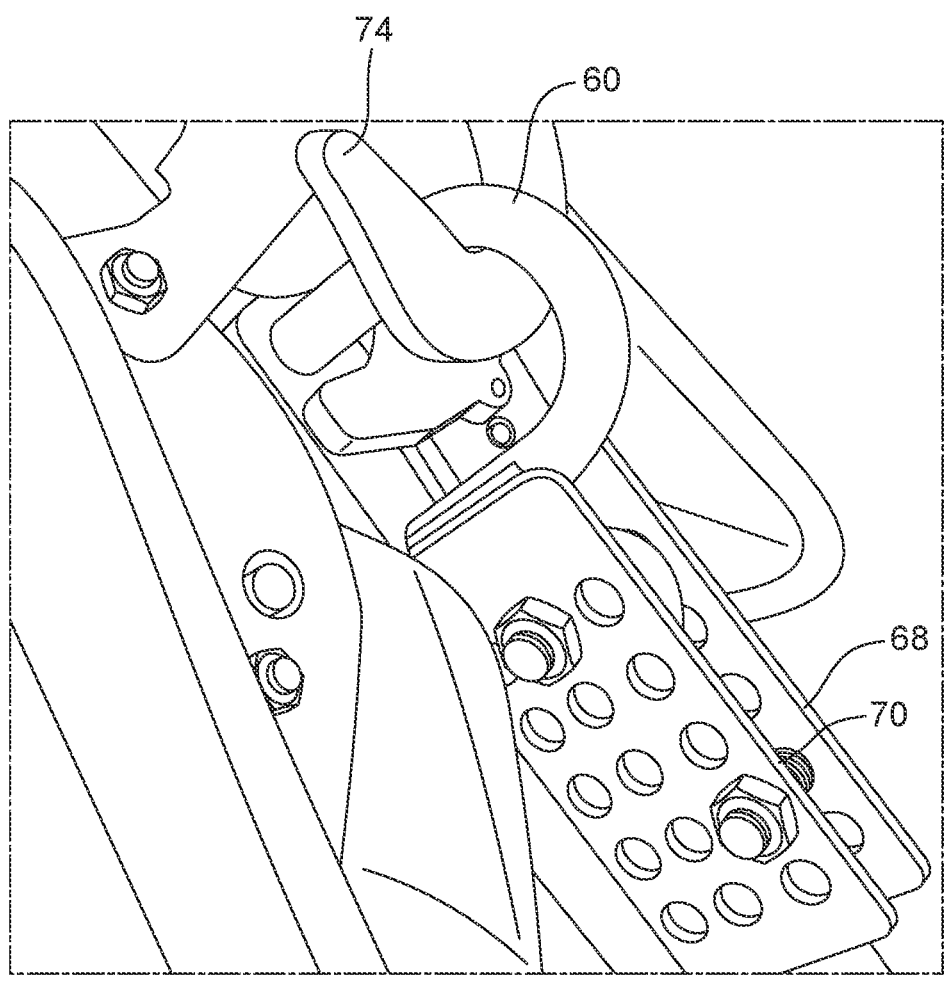
FIG. 6 is a perspective view of the bow eye adapter attached to the boat bow eye and connected to a trailer latch.

In operation, as exemplified in FIG. 6, a latch hook 74 extends through an aperture defined by the adapter 60 which itself is firmly secured to the boat bow eye 62 along mounting plates 72.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An adapter for mounting to a bow eye of a boat and receiving a latch for securing the boat to a trailer, comprising:
   a receiving member having a base and an at least partially straight engaging leg, the receiving member and the at least partially straight engaging leg defining an aperture for receiving the latch;
   at least one mounting plate extending from the base to be secured against the bow eye by at least one fastener extending through an aperture defined by the at least one mounting plate and an aperture defined by the bow eye; and
   at least one other mounting plate;
   wherein the bow eye includes a body defining the bow eye aperture, and the at least one mounting plate and the at least one other mounting plate are arranged to capture opposing sides of the bow eye body therebetween.

2. The adapter of claim 1, wherein the at least one other mounting plate is a second mounting plate adapted to be secured against the bow eye by the least one fastener, a first of the at least one fastener extends through a first aperture of a first plurality of apertures defined by the first mounting plate, the bow eye, and a first aperture of a second plurality of apertures defined by the second mounting plate, and a second of the at least one fastener extends through a second aperture of the first plurality of apertures defined by the first mounting plate and a second aperture of the second plurality of apertures defined by the second mounting plate, further wherein the first mounting plate and the second mounting plate are substantially parallel when secured against the bow eye.

3. The adapter of claim 1, wherein the base is attached to a substantially U-shaped member and the at least partially straight engaging leg forms a portion of the substantially U-shaped member.

4. The adapter of claim 1, further comprising a damper attached to the receiving member.

5. The adapter of claim 4, wherein the damper is attached to the receiving member and contacts an edge of the at least one mounting plate, an edge of the at least one other mounting plate, an inner face of the at least one mounting plate, and an inner surface of the at least one other mounting plate.

6. The adapter of claim 1, wherein the at least one mounting plate and the at least one other mounting plate are oriented substantially parallel to one another then the opposing sides of the bow eye body are captured therebetween.

* * * * *